Jan. 17, 1961 K. R. LAGLER 2,968,387
ARTICLE ORIENTING APPARATUS
Filed Aug. 26, 1959 2 Sheets-Sheet 1
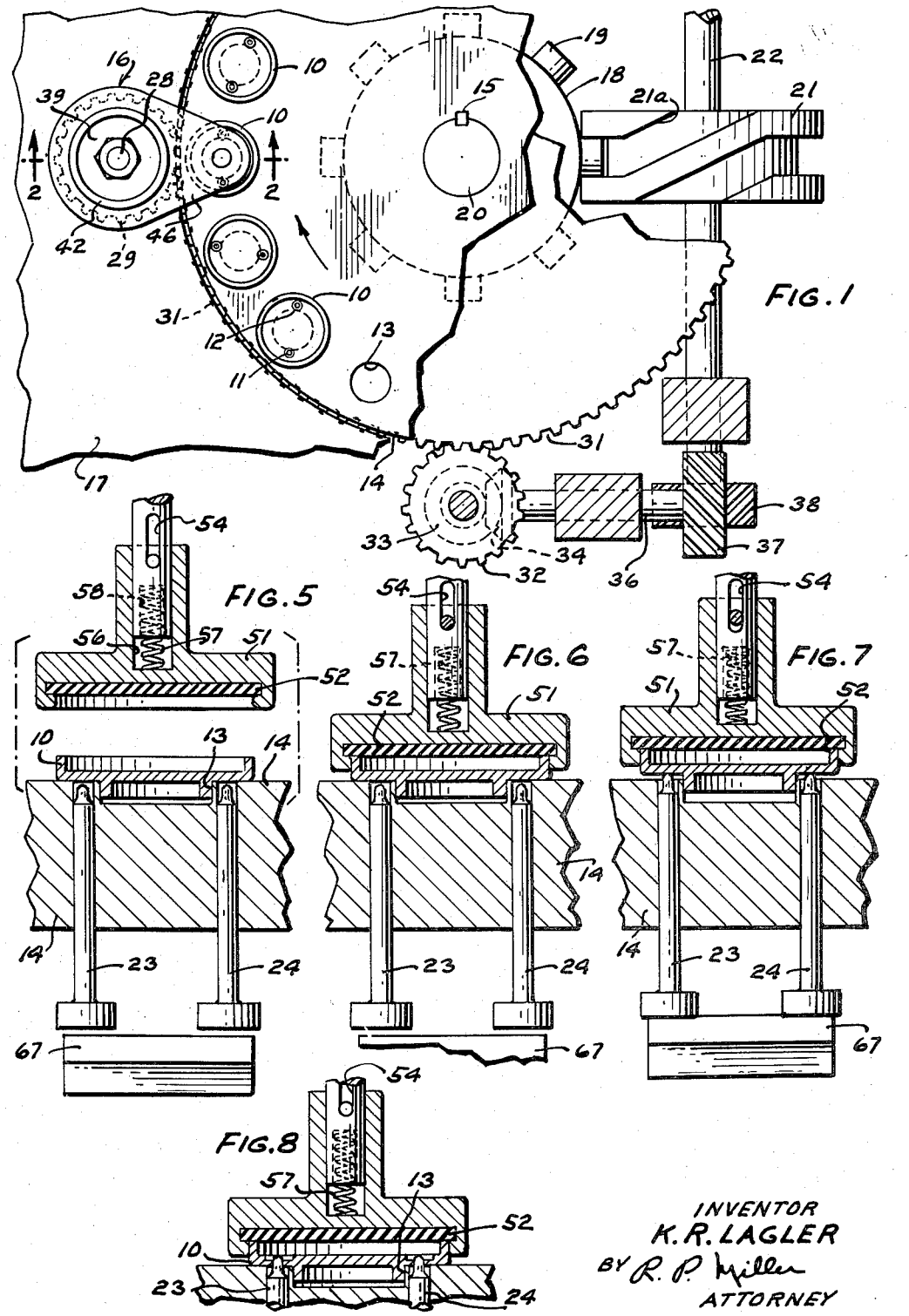
INVENTOR
K. R. LAGLER
BY R. P. Miller
ATTORNEY Jan. 17, 1961 K. R. LAGLER 2,968,387
ARTICLE ORIENTING APPARATUS
Filed Aug. 26, 1959 2 Sheets-Sheet 2
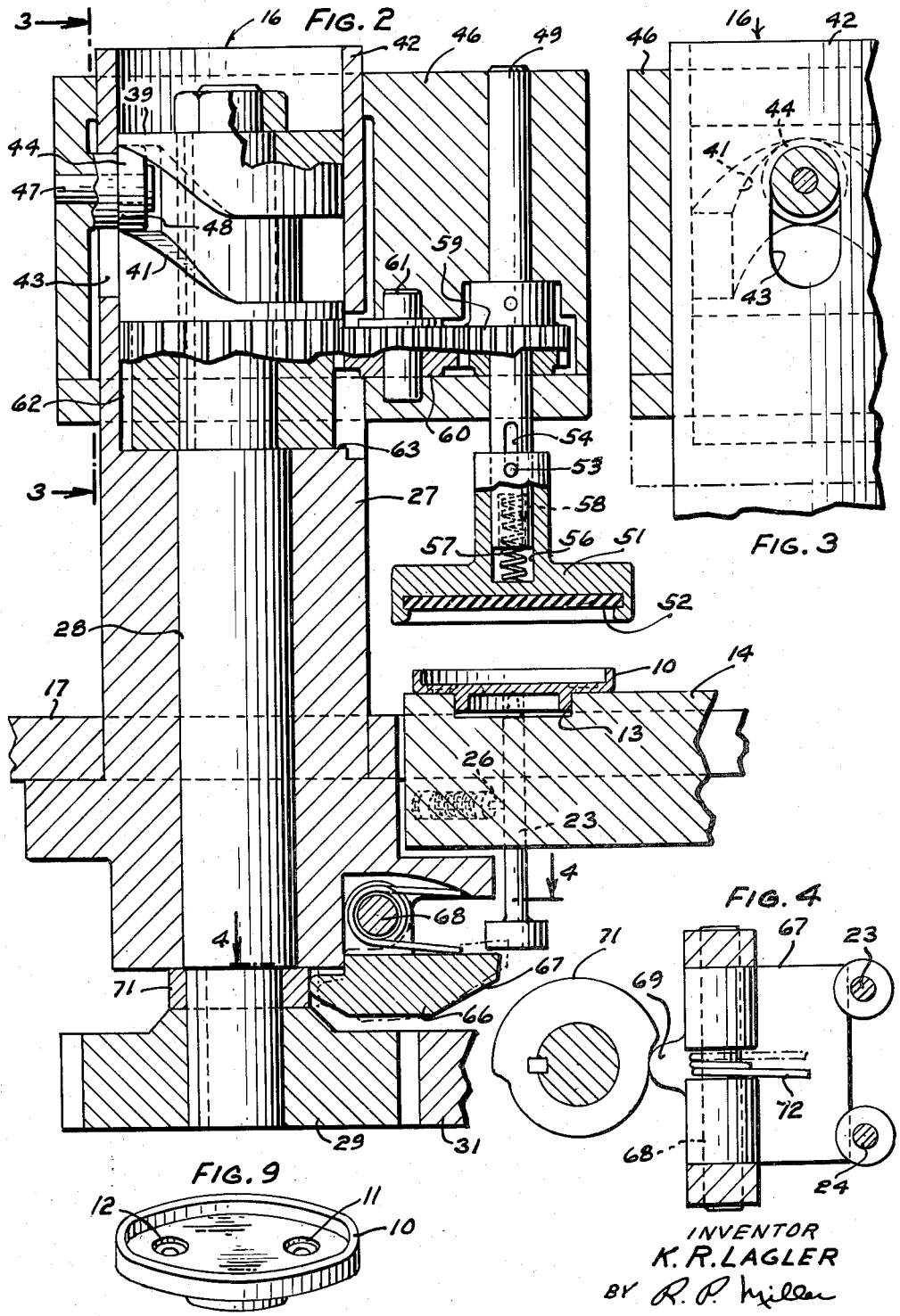
INVENTOR
K. R. LAGLER
BY R. P. Miller
ATTORNEY

United States Patent Office 2,968,387
Patented Jan. 17, 1961

2,968,387

ARTICLE ORIENTING APPARATUS

Karl R. Lagler, Indianapolis, Ind., assignor to Western Electric Company, Incorporated, New York, N.Y., a corporation of New York Filed Aug. 26, 1959, Ser. No. 836,209

5 Claims. (Cl. 198—33)

This invention relates to article orienting apparatus and more particularly to apparatus for orienting articles having apertures into which are to be inserted components.

In automatic assembling installations, articles are sequentially advanced and automatic facilities are successively rendered effective to assemble various components onto the articles. Prior to any assembly operation, it is of paramount importance to provide either manually or automatically controlled instrumentalities for orienting each article in anticipation of each successive assembling operation. Where the articles are provided with apertures into which are to be inserted components, it is necessary to accurately position the article on a carrier in order that the assembly apparatus may properly function to seat the components within the apertures.

It is a prime object of the invention to provide a new and improved article orienting apparatus.

A further object of the invention is the provision of an orienting apparatus capable of positioning an article so that apertures formed therein may subsequently receive components.

An additional object of the invention resides in a carrier for apertured articles together with facilities for engaging and rotating the article until the article assumes a predetermined orientation.

Another object of the invention is the provision of a single drive mechanism that controls the movement of an orienting head into engagement with an article, the rotation of the orienting head and the movement of orienting pins into engagement with the rotating article.

With these and other objects in view, the present invention contemplates a carrier for advancing a succession of apertured articles to an orienting apparatus whereat a rotating head is brought into engagement with the article. The drive mechanism for the carrier also functions to move a set of pins into engagement with the rotating article whereby the pins move into the apertures to hold the articles against further movement in an oriented position.

Other objects and advantages of the present invention will be apparent from the following detailed description when considered in conjunction with the accompanying drawings wherein:

Fig. 1 is a top plan view, partially cut away, of a turntable that is intermittently operated to advance articles into an orienting apparatus;

Fig. 2 is an enlarged sectional view taken along line 2—2 of Fig. 1, particularly showing the operating mechanism of the orienting apparatus that embodies the principles of the invention;

Fig. 3 is a side elevational view, partially in section, taken along line 3—3 of Fig. 2, particularly illustrating a cam mechanism for moving an orienting head toward and away from an article on the turntable;

Fig. 4 is a sectional view taken along line 4—4 of Fig. 2 showing a cam mechanism for lifting articles from the turntable against the orienting head;

Figs. 5, 6, 7 and 8 are fragmentary sectional views of the article orienting and lifting mechanisms in various stages of operation; and Fig. 9 is a perspective view of a typical article that may be oriented by the apparatus shown in the other views.

Referring first to Fig. 9 of the drawings, the part to be oriented by the apparatus shown in the other views is a disc-shaped bridge 10 of a telephone transmitter having a pair of diametrically opposed apertures 11 and 12 formed therein. The bridges are loaded into indentations 13 formed in a turntable 14 (see Fig. 1) which is indexed to advance each bridge into an orienting apparatus generally designated by the reference numeral 16. The orienting apparatus 16 is mounted on a table 17 formed to encompass the turntable 14. When a bridge is advanced into the orienting apparatus 16, the disc is rotated to place the apertures 11 and 12 in a predetermined orientation whereafter subsequent operation of the turntable effectuates an advance of the oriented article into a device (not shown) that functions to insert small steel sintered discs within the apertures. An inserting device of this sort is shown in the copending application to J. B. Holoubek and K. R. Lagler entitled "Article Inserting Apparatus," Serial No. 836,204, filed August 26, 1959.

The turntable 14 is secured by a key 15 to a shaft 20 having a hub 18. Radiating from the hub are a number of evenly spaced drive pins 19 that are sequentially operated upon by a cam 21 to index the turntable. The cam 21 is secured to a constantly rotating drive shaft 22 and is provided with a trackway 21a that has two helical sections that cooperate with each succeeding pin 19 to rotate the shaft 20. When a pin 19 is positioned within the non-helical sections of the trackway 23, the turntable is maintained in a stationary position so that the bridge 10 is positioned within the orienting apparatus 16.

Positioned adjacent to each indentation 13 formed in the turntable 14 is a set of two orienting pins 23 and 24. Each of these orienting pins is slidably mounted within the turntable and is frictionally retained in position by a spring-loaded holding pin 26. The function of the pins 23 and 24 is to engage the bridges 10 and enter the apertures 11 and 12 when the bridge is rotated, so as to maintain each bridge in a predetermined orientation on the turntable.

Considering now the details of construction of the orienting apparatus and with particular reference to Figs. 2, 3 and 4, there is shown a cylindrical standard 27 mounted in the table 17 and into which is rotatably mounted a shaft 28 having a gear 29 attached to the lower terminus thereof. The gear 29 meshes with a large gear 31 rotatably mounted about the shaft 20. As seen in Fig. 1, the large gear 31 meshes with a pinion 32 connected to a beveled gear 33 that is driven by a beveled gear 34. Beveled gear 34 is attached to a shaft 36 driven by a spiral gear 37 that meshes with a spiral gear 38 secured to the constantly rotating shaft 22.

Mounted near the upper terminus of the shaft 28 is a cam member 39 having a circumferential cam trackway 41. The upper portion of the standard 27 is counterbored to provide a sleeve 42 that surrounds the cam 39. This sleeve 42 is provided with an elongated slot 43 through which projects a boss 44 projecting inwardly from a bracket 46 that is slidably mounted on the sleeve 42. A stud shaft 47 projects from the bracket 46 through the boss 47 to provide a mounting for a rotatable cam follower roller 48 that projects into the trackway 41. The right-hand portion of Fig. 2 shows a shaft 49 rotatably mounted within the bracket 46. Slidably mounted on the lower portion of the shaft 49 is a cylindrical head 51 having a hard rubber insert 52. A pin 53 projects through a slot 54 formed in the shaft 49 to hold the head 51 on the shaft. The head 51 is provided with a bore 56 into which is positioned a spring 57 that extends within a bore 58 formed in the shaft 49. The spring 57 tends to move the head 51 away from the shaft 49; thus the pin 53 is maintained at the lower extremity of the slot 54.

The head 51 is rotated by a gear 59 attached to the shaft 49 and meshing with a pinion 60 that in turn meshes with a relatively large gear 62 secured to the shaft 28. The pinion 60 is secured to a short shaft 61 mounted for rotation in the bracket 46. It will be noted that the sleeve 42 is provided with a second slot 63 through which the pinion 60 projects. This slot 63 is sufficiently long to permit the pinion 60 to move axially with respect to the shaft 28.

Referring to Figs. 2 and 4, there is shown a rocker 66 having a plate-like section 67 that spans the pair of pins 23 and 24 positioned within the orienting apparatus 16. Rocker 66 is pivotally mounted on a shaft 68 mounted within a recess formed in the lower portion of the standard 27. The left-hand section of the rocker 66 is formed to provide a cam follower 69 that engages a cam 71 mounted on the shaft 28. A spring 72 interposed between the standard 27 and the rocker 66 urges the cam follower into engagement with the cam.

In order to appreciate the operation of the overall apparatus, assume that the parts are in the position as shown in Fig. 1, that is, the turntable 14 has just indexed to move a bridge 10 into the orienting device 16. The shaft 22 is continually applying motion through the gears 38, 37, 34, 33, 32 and 31 to the gear 29 which functions to continually rotate the shaft 28. The cam member 39 rotates so that the trackway 41 operates upon the cam follower 48 to move the bracket 46 in a downward direction. The gear 60 slides over the teeth of the large gear 62 to continuously impart rotation to the shaft 49 and hence the head 51. The sequence of operation of the head 51 and the pins 23 and 24 may be further appreciated by reference to Figs. 5-8. The bracket 46 moves the head 51 towards the bridge 10 to engage the rubber insert 52 with the bridge (see Figs. 5 and 6). The spring 57 is compressed and the head functions to rotate the bridge 10 on the turntable 14. When the head 51 moves into engagement with the bridge 10, the cam 71 is rendered effective to present a lobed portion to the follower 69 to pivot the rocker 66, whereupon the plate 67 lifts the pins 23 and 24 against the under surface of the rotating bridge 10 (see Fig. 7). The bridge 10 will continue to rotate until such time as the pins 23 and 24 move into the apertures 11 and 12 (see Fig. 8). The movement of the pins 23 and 24 into engagement with the bridge 10 is effective to slightly lift the bridge from the turntable 14 because of the resilient mounting of the head 51. When the bridge 10 is held from rotation, the bridge will again be seated within the indentation 13 in an oriented position. The head 51 is withdrawn and the pins 23 and 24 are frictionally maintained within the apertures 11 and 12. The turntable is again indexed to move the oriented bridge to the inserting apparatus and another bridge is moved into position to be oriented.

It is to be understood that the above-described arrangements of apparatus and construction of elemental parts are simply illustrative of an application of the principles of the invention and many other modifications may be made without departing from the invention.

What is claimed is:

1. An orienting apparatus which comprises a support for an article having a plurality of apertures formed therein, a resiliently mounted head, means for mounting said head for rotative and axial movement, means for axially moving said head into engagement with an article on said support, a plurality of locating pins slidably mounted in said support and adapted to move through said apertures, a lever for engaging said pins, means for pivoting the lever to advance said pins against said article whereby the article is lifted from the support against the action of said resilient mounted head, and means for rotating said head to cause said pins to pass through said apertures.

2. An orienting apparatus for an article having apertures formed therein, which comprises a support for said article, an orienting head mounted for axial and rotative movement, a first cam for axially moving said head into engagement with said article, a group of pins slidably mounted in said support and adapted to pass through said apertures, yieldable means for retaining said pins in position, a lever adapted to be pivoted into engagement with said pins, a second cam for pivoting said lever to move said locating pins to elevate said article against the orienting head, means for rotating said head whereby the pins move within said apertures to hold the article from rotation, and means for operating said cams to sequentially move said head and then said pins.

3. An orienting apparatus for an article having a pair of apertures formed therein, which comprises a support for said article, a shaft, a first cam mounted on said shaft and having a circumferential cam slot, a stationary sleeve mounted about said first cam, said sleeve having a longitudinally extending slot formed therein intersecting said circumferential cam slot, a support bracket mounted for movement along said sleeve, a cam follower mounted on said support bracket and extending through the slot in the sleeve into said circumferential cam slot for guiding said bracket to move axially along the sleeve, a head rotatably mounted on said support bracket, means on said shaft for rotating said head, a pair of locating pins slidably mounted in said article support in alignment with said head, said pins being adapted to move through the apertures in said article, a lever for engaging and advancing said pins to lift the article against said head, a second cam mounted on said shaft for pivoting said lever, and means for rotating said shaft whereby said first cam moves said rotating head into engagement with the article and then said second cam pivots the lever to raise the pins to lift the article against the head.

4. In combination, an orienting apparatus and a carrier for an article having apertures formed therein, said carrier having a plurality of slidably mounted pins over which an article is placed, said orienting apparatus including a head mounted for rotative movement and axial movement toward the carrier, a lever pivotally mounted within said orienting apparatus in alignment with said head, drive means for advancing the carrier to position the pins and an article between said head and lever, means operated by the drive means for axially moving said head into engagement with the article, means operated by the drive means for pivoting the lever to advance the pins and lift the article against the head, and means operated by the drive means for rotating the head to rotate said article until said pins move within the apertures.

5. In combination, an orienting apparatus and a turntable adapted to receive a plurality of circumferentially spaced articles having apertures formed therein, a drive means for indexing said turntable to advance each article into said orienting apparatus, said turntable having a plurality of groups of pins slidably mounted therein, each group of pins being associated with an article, a head mounted in said orienting apparatus for rotative movement and axial movement toward said turntable, a lever mounted in said orienting apparatus and adapted to cooperate with each group of pins advanced into the orienting apparatus, a first cam means operated by said drive means for axially moving the head into engagement with each article advanced into the orienting apparatus, a second cam means operated by said drive means for pivoting said lever to advance the pins to move the article against said head, and means operated by said drive means for rotating said head to rotate the article on the pins until said pins pass through the apertures formed in the article.

References Cited in the file of this patent

UNITED STATES PATENTS 2,609,912    Engel _____ Sept. 9, 1952